Dec. 18, 1928.  1,696,086
R. P. HARDY
NUT GRADER AND SORTER
Filed Oct. 24, 1927  3 Sheets-Sheet 1

R. P. Hardy
INVENTOR
BY Victor J. Evans
ATTORNEY

Dec. 18, 1928.  
R. P. HARDY  
NUT GRADER AND SORTER  
Filed Oct. 24, 1927
1,696,086
3 Sheets-Sheet 2
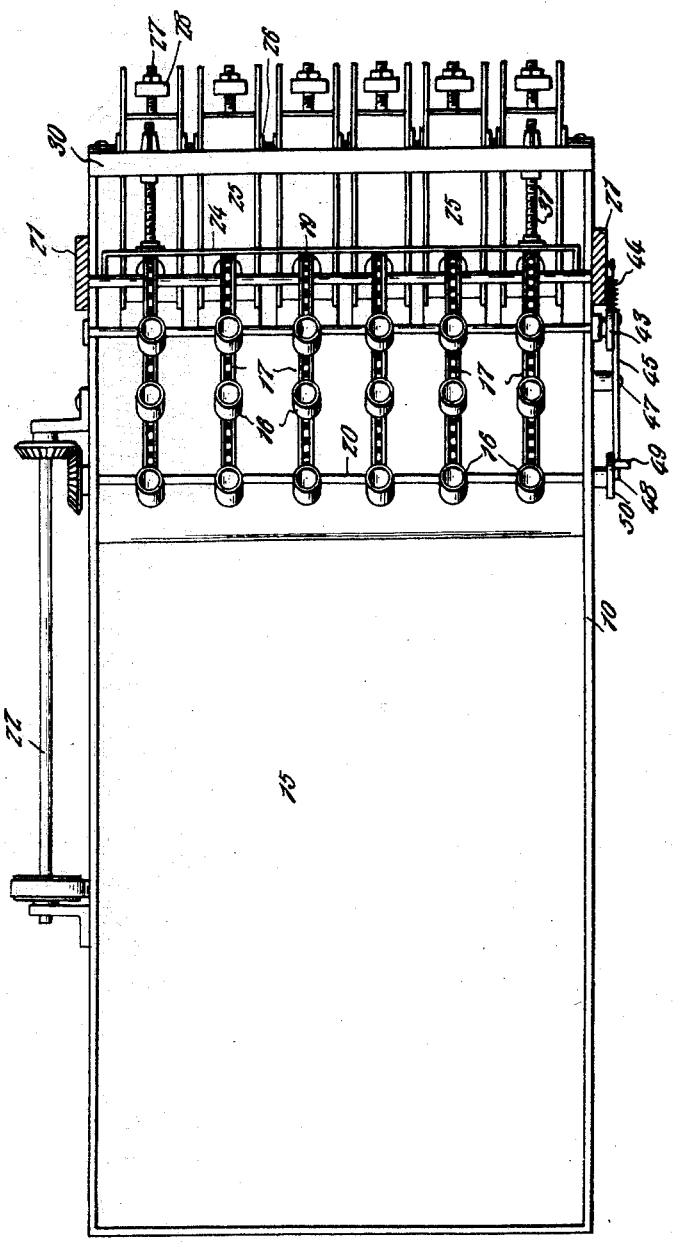
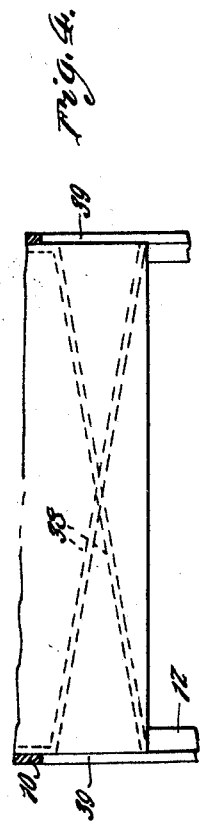
R. P. Hardy  
INVENTOR  
BY Victor J. Evans  
ATTORNEY Dec. 18, 1928.
R. P. HARDY
1,696,086
NUT GRADER AND SORTER
Filed Oct. 24, 1927      3 Sheets-Sheet 3
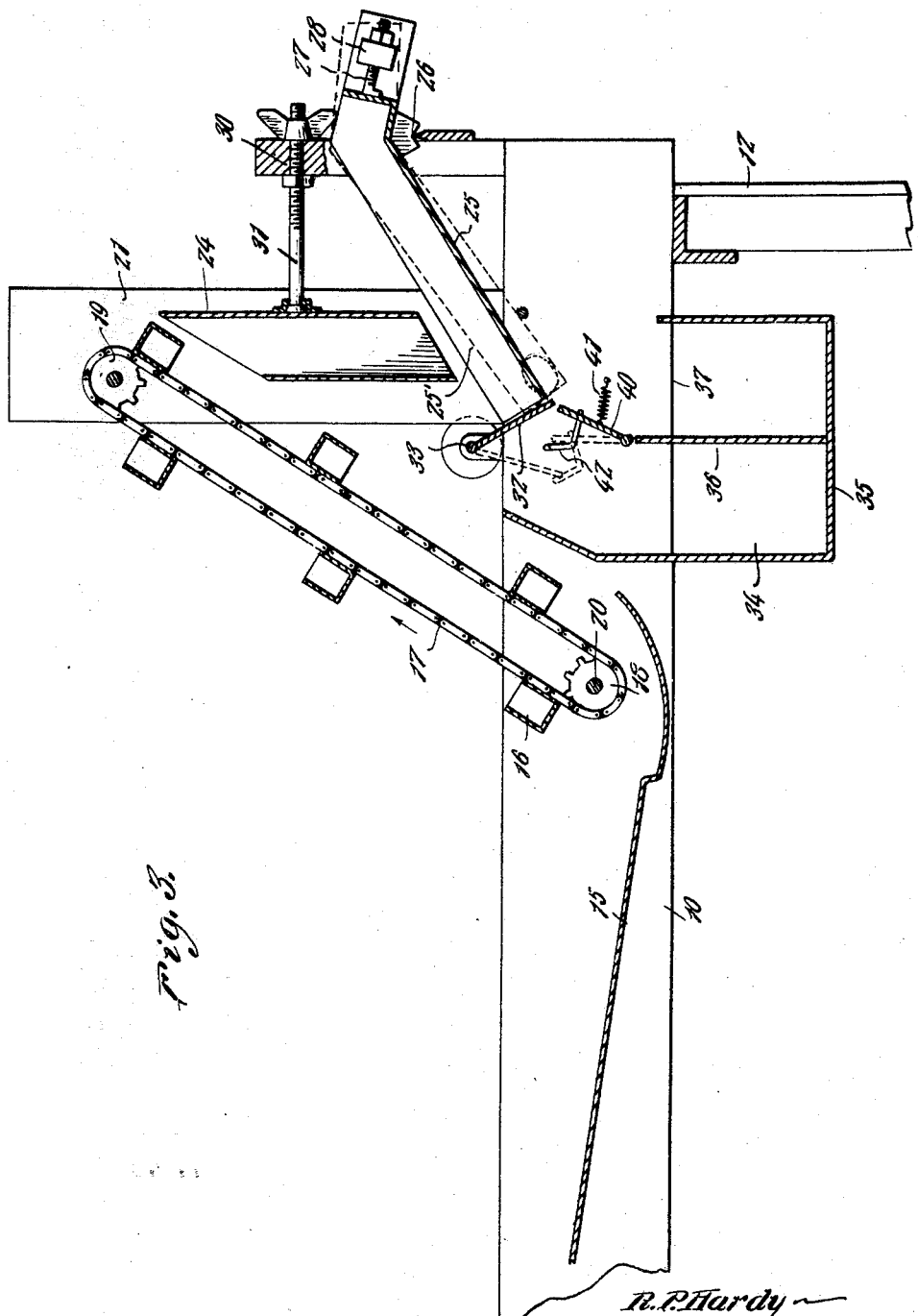

Patented Dec. 18, 1928.

1,696,086

UNITED STATES PATENT OFFICE.

RALPH P. HARDY, OF OCEAN SPRINGS, MISSISSIPPI.

NUT GRADER AND SORTER.

Application filed October 24, 1927. Serial No. 228,403.

This invention contemplates the provision of a machine for automatically separating light and unfilled nuts of various sorts from the heavy ones, which of course are well filled, and subsequently conveying the faulty nuts in a different direction from the properly filled nuts, both grades of nuts being received in suitable receptacles.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 2 is a top plan view.

Figure 3 is a vertical sectional view.

Figure 4 is a sectional view through the receptacle which receives and separates the faulty nuts from the more perfect nuts.

Figure 1:
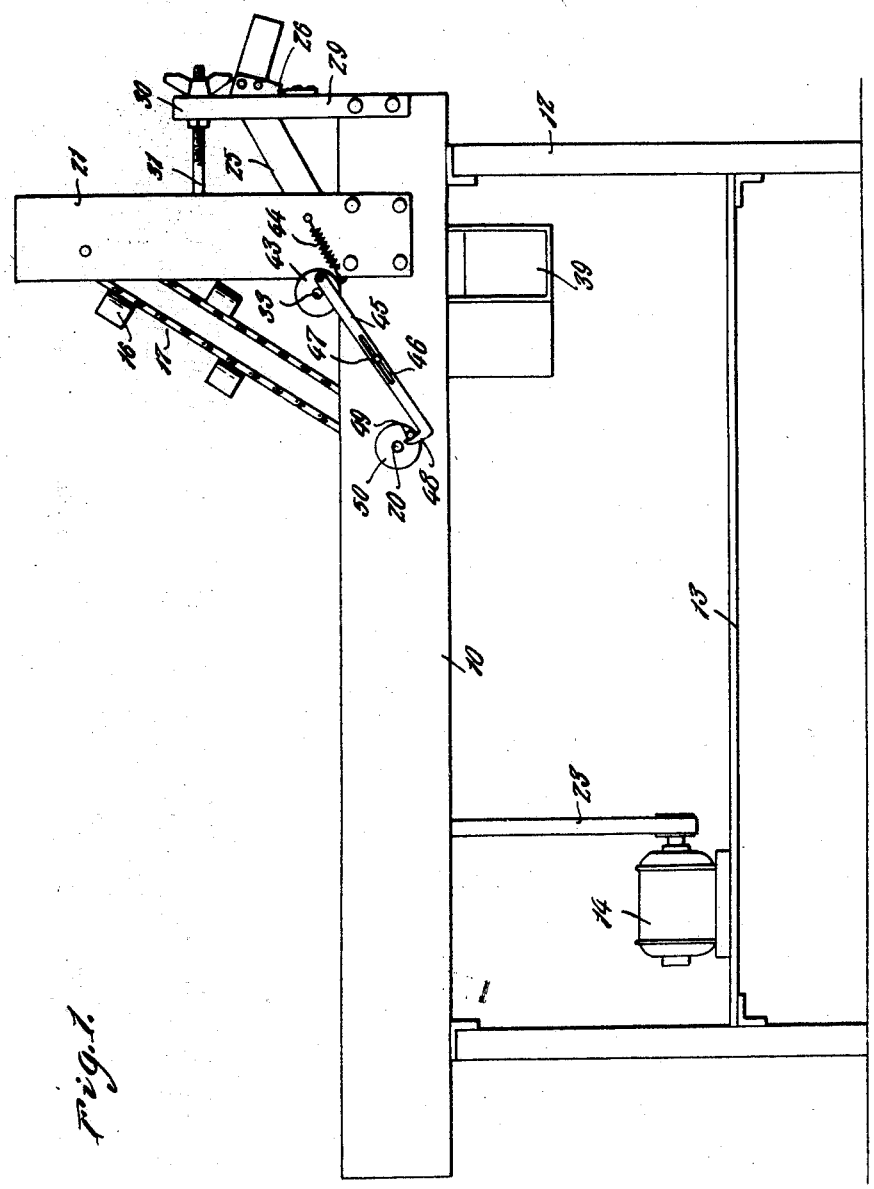
Figure 1 is a side elevation of the machine forming the subject matter of the present invention.

Referring to the drawings in detail, 10 indicates the body of the machine which is preferably supported by legs 12, the latter supporting a platform 13 on which is mounted a suitable motor 14 for operating the mechanism to be hereinafter described. The body 10 is in the nature of an elongated trough in which the nuts are initially deposited, and this trough includes an inclined bottom 15 so that the nuts roll toward one end of the machine, where they are singly lifted from the trough by means of suitable buckets 16 properly spaced upon endless chains 17. Each chain is trained over sprockets 18 and 19 respectively, and the sprockets 18 are carried by a shaft 20 journaled in the opposed sides of the body portion 10, while the shaft for the sprockets 19 is journaled in spaced standards 21 rising from the opposed sides of the machine as clearly illustrated. Of course any number of sprockets and endless chains may be employed without departing from the spirit of the invention. A shaft 22 is arranged parallel with the body 10, and is rotated by a belt 23 operated from the motor 14, and this shaft 22 is geared with the shaft 19 to operate the endless chains 17.

Arranged between the standards 21 is a vertically disposed channel-like guide indicated at 24, through which the nuts are conveyed onto a balanced beam 25. This beam is pivoted as at 26 and carries a threaded element 27 with which a weight 28 is adjustably associated so that the beam 25 can be properly balanced and arranged to meet different conditions. Each beam operates between standards 29 rising from the rear of the machine and which standards are connected by a cross piece 30 through which a bolt 31 passes. These bolts are connected to support the channel-like guide 24.

As illustrated in Figure 3 the balanced beams are provided with parallel sides 25', and are arranged directly beneath the guide 24, so that the nuts as they pass through the guides fall upon the beams 25, one nut being deposited on each beam at a time. Each beam is open at its lower end as illustrated in Figure 3, and each beam is provided with a gate 32 carried by a shaft 33, and these gates are normally arranged to close the lower end of the beams 25. The shaft 33 is connected with the shaft 20 in a manner to be rotated and thereby move the gates 32 away from the beams 25 at predetermined periods of time, thus allowing the light or faulty nuts to pass from the beams 25 into the compartment 34 of a receptacle 35 arranged as shown in Figure 3. A partition 36 divides this receptacle into compartments 34 and 37, the heavy or properly filled nuts falling into the compartment 37. As illustrated in Figure 4 the bottom of the compartment is inclined as at 38, the bottom of one compartment being inclined in a direction opposite to that of the other compartment so that the nuts received by the respective compartments are conveyed in different directions and pass out through openings 39 to be received by other receptacles not shown.

Pivoted above the partition 36 is a vertically disposed plate 40 connected by a spring 41 which normally holds the plate 40 at an angle to the pivoted beam as shown in Figure 3. A substantially L-shaped arm 42 is carried by the plate 40 and has one branch disposed in the path of movement of each gate 32, so that when the gate is swung from the full line position shown in Figure 3 to its dotted line position illustrated in the same figure, incident to the partial rotation of the shaft 33, the arm 42 will be engaged by the gate to swing the plate 40 in true vertical alignment with the partition 36.

In practice the nuts to be separated with a view of removing the light faulty unfilled nuts from the heavy properly filled nuts are deposited into the trough 15, and roll downwardly on the bottom thereof in the direction of the endless chain 17. As the chain is rotated the buckets 16 singly pick up the nuts from the trough, and as the positions of the buckets are reversed, or inverted, the nuts are dropped into the channel-like guide 24, passing therethrough onto the balanced beams 25. It is of course understood that these beams singly receive the nuts, the latter rolling in the direction of the lower end of the beam. The position of the gates 32 and the plate 41 are as illustrated by full lines in Figure 3. If the nuts are heavy, that is properly filled, they force the beam downwardly to the dotted line position illustrated in Figure 3, the beam being limited in its movement in this direction by a stop 40'. As the gate 32 moves away from the adjacent end of the beam, the nut is allowed to partly leave the beam but strikes the deflector 40 which is subsequently moved from its full line position to the dotted line position shown in Figure 3. When the deflector is thus shifted to its dotted line position the nut is allowed to fall into the compartment 37, and in this manner the machine is prevented from being clogged with nuts too large to fall from the beam into the compartment 37 with the deflector 40 in its normal position. As above stated these gates 32 simultaneously move away from the beams at proper intervals, and when so moved, they engage the arms 42 moving the deflector 40 to the position illustrated by dotted lines in Figure 3. In other words the machine is timed so that the nuts are singly deposited upon the beam and subsequently allowed to pass therefrom into one or the other of the compartments indicated at 34. If, however, the particular nut received by the beam, is a light nut, indicating that it is not properly filled, the beam will not assume the dotted line position shown in Figure 3. The light nut will remain in the beam until the gate 32 is opened whereupon the nut will pass from the beam over the deflector 40 into the compartment 34. It is of course understood that the light nut is deposited within the compartment 34 before the deflector is moved from its normal position in the manner above described.

For the purpose of rotating the shaft 33 for the purpose just mentioned, the said shaft is provided with a disk 43 connected by springs 44 to the adjacent standard 21. Extending from this disk is an arm 45 longitudinally slotted as at 46 to receive a pin 47 projecting from the side of the body 10. Thus the arm 45 is allowed both sliding and pivotal movements, the lower end of the arm being offset as at 48 and arranged in the path of movement of the pin 49 carried by the disk 50 associated with the shaft 20. Consequently during each revolution of the shaft 20 the pin 49 strikes the offset extremity 48 of the arm 42, exerting a pull against the latter which rotates the shaft 33, until the pin 49 moves away from the offset extremity of the arm 45. During this movement of the arm the gates 32 are moved away from the balanced beams, and when the pin 49 moves away from the arm, the springs 44 return the latter to normal position. Consequently the heavy nuts will be allowed to fall into the compartments 37 as they reach the bottom of each of the balanced beams, while the mechanism is timed to allow the faulty unfilled nuts, which are too light to trip the beam, to fall into the compartment 34 during each complete revolution of the disk 50.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. A machine of the character described comprising a trough, endless chains operating above the trough, buckets carried by each chain and adapted to singly receive nuts from the trough, a balanced beam arranged beneath each chain and upon which the nuts are singly deposited from said buckets, a gate normally closing the lower end of each beam, the heavy nuts tilting said beam to allow said nuts to fall therefrom, means for directing said nuts in a particular direction, and means for opening said gates at predetermined intervals to allow the lighter nuts to drop from said beams in a different direction from said heavy nuts.

2. A machine for separating light faulty nuts from heavy properly filled nuts, comprising a trough adapted to receive said nuts, endless chains operating above the trough, buckets carried by each chain and adapted to singly remove the nuts from the trough, a balanced beam for each chain, and arranged to singly receive the nuts from the buckets thereof, an adjustable weight carried by each beam, a gate normally closing the lower end of each beam, the heavy nuts being adapted to tilt said beam and allow said nuts to fall therefrom, and means operated simultaneously with said chains for moving the gates away from said beams at predetermined intervals to allow the lighter nuts to pass from said beams, and means for guiding the light nuts in a different direction from said heavy nuts.

3. A machine for separating light unfilled nuts from heavy properly filled nuts, comprising a trough adapted to receive said nuts, endless chains operating above said trough, spaced buckets carried by each chain and adapted to singly remove the nuts from the trough, a balanced beam arranged beneath each chain, means for guiding each nut onto the adjacent beam as it is released from each bucket, a gate normally closing the lower end of each beam, a receptacle arranged beneath said beams and divided into separate compartments, the heavy nuts being adapted to tilt said beam and allow said nuts to fall into one of said compartments, means for moving said gates away from said beams at predetermined intervals to allow the lighter nuts on said beam to pass therefrom, and a pivoted plate arranged above the partition of said receptacle and actuated by said gate for directing the light nuts into the other compartment of the receptacle, and means for returning said gate and plate to their normal positions after each operation.

In testimony whereof I affix my signature.

RALPH P. HARDY.